INVENTOR
H. D. Algie
BY Fetherstonhaugh & Co.
ATTORNEYS

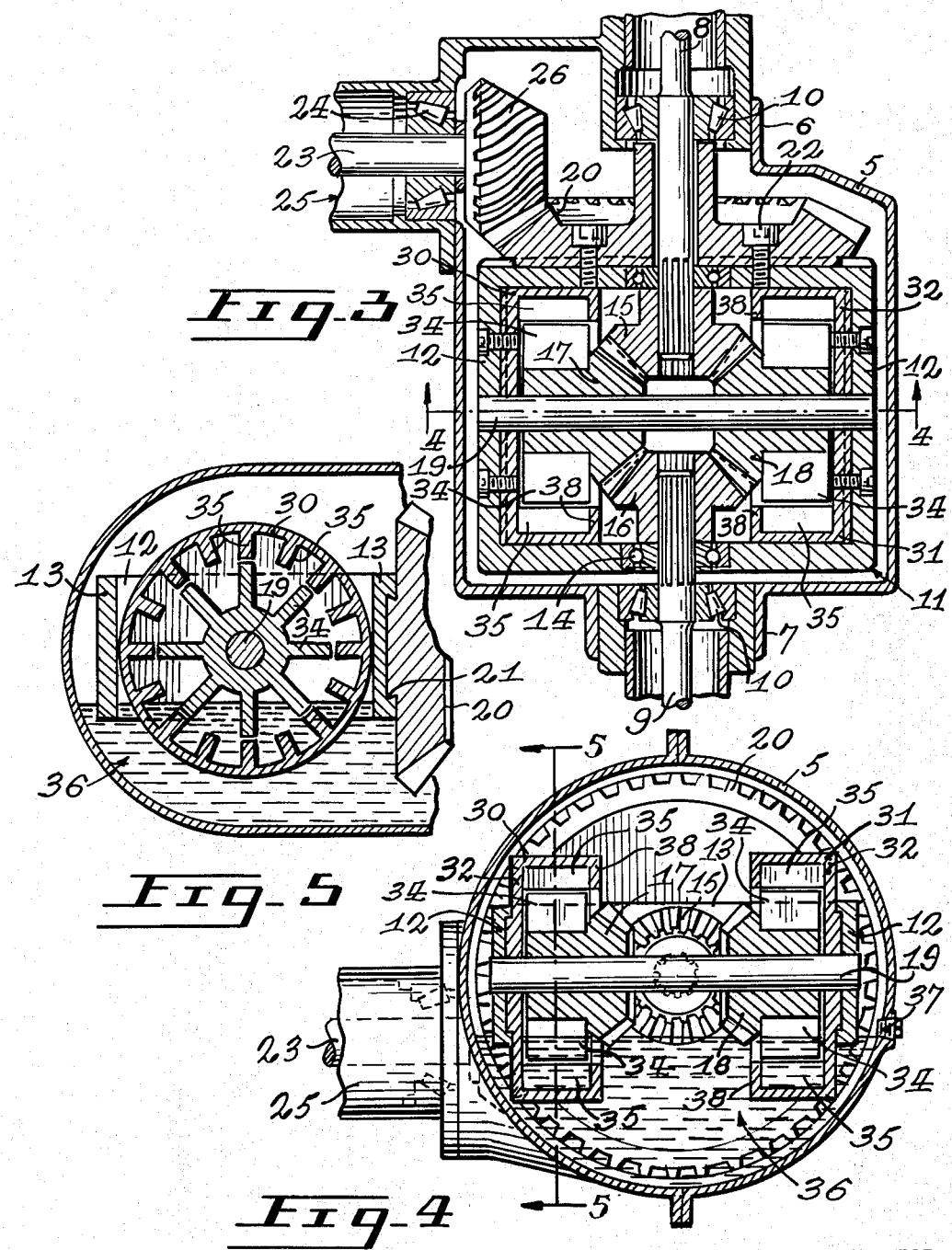

United States Patent Office 2,746,320
Patented May 22, 1956

2,746,320

DIFFERENTIAL MECHANISMS

Harry D. Algie, Montreal West, Quebec, Canada

Application June 18, 1954, Serial No. 437,613

7 Claims. (Cl. 74—711)

This invention relates to differential mechanisms and more particularly to a differential mechanism in which provision is made for resisting rotation of the differential gears to overcome differential movement when the power which is transmitted to the differential gears tends to rotate one axle at a relatively greater speed than the remaining axle.

An object of this invention is to provide a differential gear control in the differentials of self-propelled vehicles which will tend to adjust the propelling force in both of the rear driving wheels so as to rotate said wheels at a uniform rate of speed whenever conditions tend to spin the one relative to the other.

Under certain slippery conditions, such as with snow and ice, with the conventional differential, when one of the driving wheels has little or no friction contact, there is the tendency for that wheel to spin on the slippery surface while no power is transmitted to the remaining wheel. This, of course, renders the vehicle immobile. Then, too, when travelling under slippery road conditions, the application of braking force will sometimes lock one driving wheel, which increases the tendency toward a side skid until the wheel is unlocked. If there is no provision for immediately unlocking the wheel, the vehicle must continue skidding until the locked wheel engages a sufficiently resistant surface to impart rotation thereto.

The present invention proposes to overcome these disadvantages and to correct the defects of the conventional differential mechanism from which these disadvtanges arise.

A particular object of this invention is to provide a differential mechanism with a braking means interposed between the differential pinion gear and a rotary carrier therefor and operable to apply braking force to the pinion gear when the latter is rotated relative to the carrier at a speed above a predetermined value.

The braking force of the pinion gears is preferably applied by oil or lubricant pressure, which is frequently referred to as hydraulic pressure created by a centrifugal force applied to the oil between series of stationary and movable vanes. This is accomplished by securing a drum with stationary vanes to the pinion gear carrier and providing the pinion gear with vanes rotatable therewith and positioned within the drum. As the carrier revolves about the axle shafts, oil is scooped up from the differential housing through an open face in the drum and deposited between the vanes.

As the maximum function of a differential mechanism is to permit a vehicle to negotiate its minimum turning circle with a flat tire on the outside wheel, any freedom beyond that is unnecessary. The rotary and stationary vanes of the pinion gear and the drum, respectively, must, therefore, be arranged to permit a sufficient speed of rotation of the pinion gear to accomplish this function. Beyond this speed of rotation, for example, as when one wheel encounters a slippery surface, the centrifugal force of the oil in the drum between the vanes builds up a pressure against the rotating vanes of the pinion gear confining its speed of rotation to the rate of speed under which said maximum function is obtained. This braking of the pinion gear transmits the differential torque to both axle bevel gears to ensure that both axles will receive driving force.

Proceeding now to a more detailed description, reference will be had to the accompanying drawings, in which Fig. 1 is a plane view of a differential mechanism embodying my invention, the housing being shown in section for clarity.

Fig. 3 is a sectional view taken along the lines 3—3 of Fig. 2.

Fig. 4 is a sectional view taken along the lines 4—4 of Fig. 3.

Fig. 5 is a sectional view taken along the lines 5—5 of Fig. 4.

Figure 1:
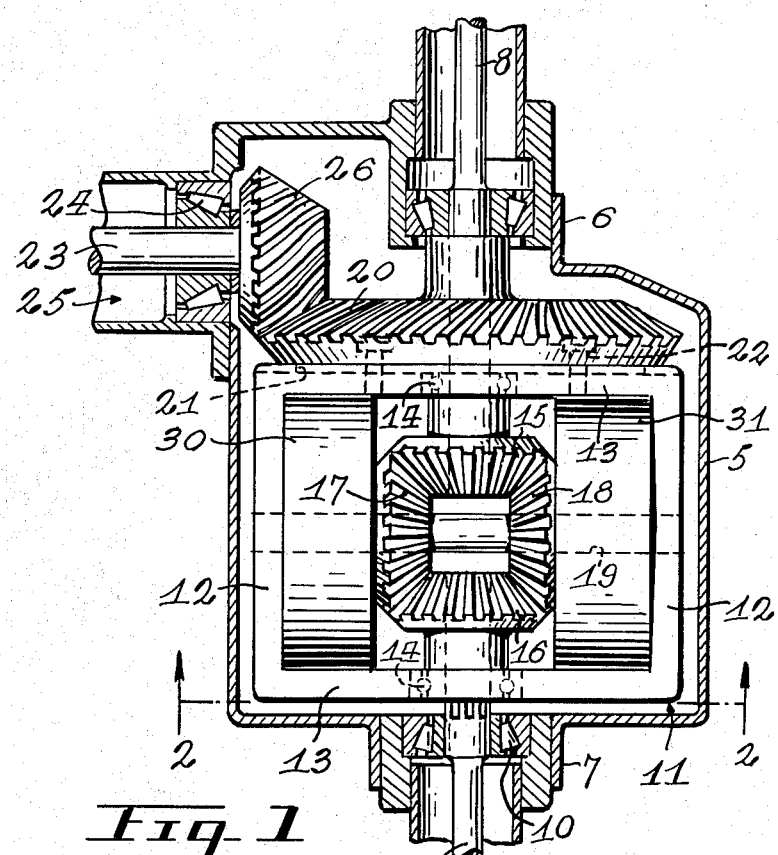
Figure 2:
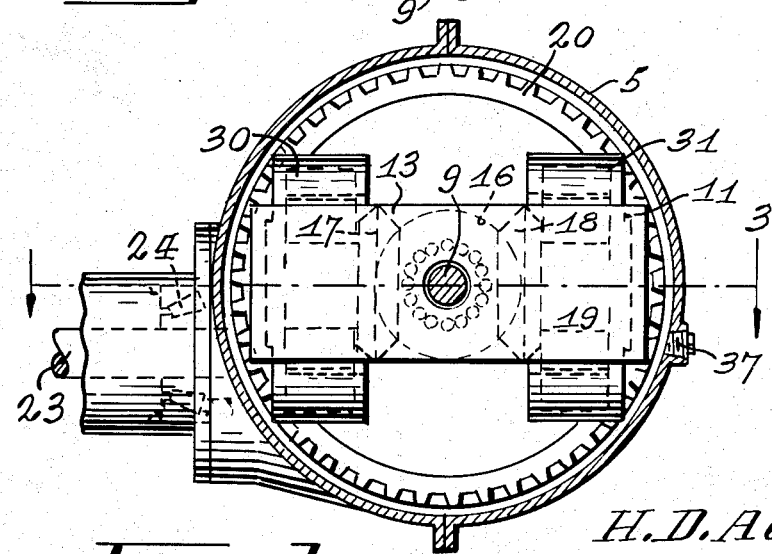
Fig. 2 is a sectional view taken along the lines 2—2 of Fig. 1.

Referring more particularly to the drawings, 5 generally indicates a differential gear housing which may be of any suitable size and construction, it being formed of two sections secured together along the vertical medial plane thereof, in any well known manner.

The housing 5 has two opposing, axially aligned hub portions 6 and 7 through which the inner ends of a pair of opposing wheel axle shafts 8 and 9 extend and which axles are mounted for free rotation in bearings 10 carried by said hubs. A rectangular pinion gear carrier frame 11 comprising two end walls 12 and two opposing side walls 13 is mounted for rotation within said housing 5 about an axis coinciding with the common axes of said axle shafts 8 and 9, said axle shafts extending through bearings 14 in openings in the side walls 13 of frame 11.

Within frame 11 the axle shafts 8 and 9 are provided at their inner end with bevel gears 15 and 16, respectively, which are secured to said axles to rotate therewith. Pinion gears 17 and 18 are mounted within said carrier frame 11 to rotate relatively thereto about a shaft 19 carried by the end walls 12 so that the axes of rotation of said pinion gears 17 and 18 are at right angles to the axis of rotation of said carrier frame 11. The pinion gears 17 and 18 are interposed between the axle shaft gears 15 and 16 to mesh therewith. A ring gear 20, which is mounted to freely rotate about axle shaft 8, is secured in any suitable manner to the adjacent gear carrier frame side wall 13. For example, I have illustrated one method of securing by an interfitting dovetail arrangement at 21 as well as by screws 22. A power driven shaft 23, mounted in bearing 24 in a side opening 25 in the housing 5, has a drive shaft pinion 26 fixed to rotate therewith, which drive shaft pinion meshes with the teeth of ring gear 20 to rotate the latter and said pinion gear carrier frame 11 about said axis coinciding with the common axes of asid axle shafts.

A pair of stationary drums 30 and 31, which are open at one end, are located at opposite sides of frame 11, each having its closed end 32 rigidly secured to the inner surface of an adjacent end wall 12 of frame 11 in axial alignment with the axis of the pinion gear carrying shaft 19, and with its open end directed inwardly.

A circular series of spaced, radially extending vanes 34 are rigidly secured to each of said pinion gears 17 and 18 and extend into said drum through the open end thereof. Although I have illustrated these vanes as being formed integrally with the shank portion of said pinion gears, they may be formed integral with a collar which would fit about shaft 19 and be secured to said pinion gears to rotate therewith about said shaft. Drums 30 and 31 are also provided with a circular series of inwardly projecting radially extending stationary vanes 35. The outer ends of vanes 34 lie in a circular path which is concentrically disposed within a circular path along which the inner ends of the vanes 34 lie so as to place the opposing edges of the vanes 34 and 35 in close proximity.

The drums 30 and 31 are alternately submerged in the lubricant, indicated at 36, by rotation of the frame 11, the housing being normally partially filled to a predetermined level indicated by a filler opening at 37. Each drum, upon being submerged in the lubricant, is filled through the open end. A flange 38 which projects inwardly from the peripheral edge of the drum assists in retaining a substantial portion of the lubricant in the drum for the duration of its travel above the lubricant level.

When the two axle shafts 8 and 9 are free to rotate at substantially the same rate of speed, the pinion gears 17 and 18 will exert their driving force on the axle bevel gears 15 and 16 substantially without rotation of the pinion gears about their own axes. Thus the vanes 34 will be substantially idle with respect to the fixed vanes. However, as soon as there is a substantial difference created between the rate of speed of rotation of one axle relative to the other, the pinion gears will commence to rotate about their axes at an increased rate of speed, causing the vanes 34 to rotate within the drums at a rate of speed which will throw the lubricant trapped therein against the stationary vanes 35. This sets up a braking force which retards rotation of the pinion gears to thereby distribute the driving force between the two axle bevel gears until the speed of rotation of the separate axles is substantially equalized. In the drawings, I have provided the drums with twice as many vanes 35 as there are vanes 34 carried by the gears. This is purely an arbitrary showing as the number of vanes 35 may be increased or decreased according to the braking force required. However, when the vanes 34 are widely spaced apart, particularly at their outer ends, it is usually desirable that the number of internally extending fixed vanes 35 be in excess of the number of vanes 34 in order to increase the braking efficiency. But care should be taken not to increase the number of vanes 35 to a point which would substantially cut off the flow of lubricant therebetween which has been forced outwardly from the rotating vanes 34 and thus reduce the braking pressure therebetween.

In addition to the number of vanes, the clearance between the opposing edges of the stationary and rotating vanes is an important factor in determining the amount of freedom of rotation of the pinion gear in order to perform the maximum function of the differential mechanism. This clearance should preferably be sufficient to allow escape of the oil between the vanes up to a predetermined rate of speed of rotation of the pinion gears.

I claim:

1. A differential mechanism comprising a differential gear housing partially filled with lubricant, axially aligned shafts having opposing end portions disposed within said housing bevel gears carried by the said end portions of the shafts, a bevel pinion gear interposed between and meshing with said shaft gears, a pinion gear carrier mounted in said housing to revolve relative to the housing and about an axle coinciding with the common axes of said shafts, said pinion gear being mounted on said gear carrier and rotatable relative thereto about an axis at right-angles to the axis of rotation of said carrier, a circular series of spaced, radially extending vanes rigidly carried by said pinion gear, a drum in which said vanes are positioned, said drum being rigidly secured to said carrier and provided with a circular series of inwardly projecting, radially extending vanes for cooperation with the vanes of said pinion gear, said drum being submersible in said lubricant in the gear housing during the cycle of rotation of said pinion gear carrier and being provided with an opening through which the lubricant enters and fills the drum when the latter is submerged in the lubricant, which serves to resist rotation of the vanes of said pinion gear relative to the drum, and a drive shaft geared to said gear carrier.

2. A different mechanism, as set forth in claim 1, in which the number of vanes carried by said drum is at least equal to the number of vanes carried by said pinion gear.

3. A differential mechanism, as set forth in claim 1, in which the number of vanes carried by said drum is greater than the number of vanes carried by said pinion gear.

4. A differential mechanism, as set forth in claim 1, in which the number of vanes carried by said drum is twice that of the number of vanes carried by said pinion gear.

5. A differential mechanism, as set forth in claim 1, in which the opposing terminal portions of the vanes of said drum and said gear are spaced apart to provide a gap therebetween of a distance which permits a predetermined quantity of the lubricant to flow therebetween.

6. A differential mechanism comprising a differential gear housing partially filled with lubricant, axially aligned shafts having opposing end portions disposed within said housing, bevel gears carried by the said end portions of the shafts, a pair of oppositely disposed bevel pinion gears interposed between and meshing with said shaft gears, a pinion gear casing mounted in said housing to revolve relative to the housing about an axis coinciding with the common axes of said shafts, said pinion gears being mounted on said gear carrier and rotatable about an axis at right-angles to the axis of rotation of said carrier, a circular series of spaced, radially extending vanes rigidly carried by each of said pinion gears, a drum in which the vanes of one pinion gear are positioned, a second drum in which the vanes of the other pinion gear are positioned, said drums being rigidly secured to said carrier at opposite ends thereof, each drum being provided with a circular series of inwardly projecting, radially extending vanes for cooperation with the vanes of said pinion gear located in said drum, said drums being alternately submersible in said lubricant in the gear housing in response to rotation of the carrier, and being provided with an opening through which lubricant enters and fills the drum, said lubricant being effective to resist rotation of the pinion gear vanes relative to the drums, and a drive shaft geared to said gear carrier.

7. A differential mechanism comprising a differential gear housing partially filled with a lubricant, axially aligned shafts having opposing end portions disposed within said housing, bevel gears carried by the said end portions of the shafts, a bevel pinion gear interposed between and meshing with said shaft gears, a pinion gear carrier mounted in said housing to revolve relative to the housing about an axis coinciding with the common axes of said shafts, means operable to revolve said carrier, said pinion gear being mounted on said gear carrier and rotatable relative thereto about an axis at right-angles to the axis of rotation of said carrier, a circular series of spaced, radially extending vanes rigidly carried by said pinion gear, a drum in which said vanes are positioned, said drum being rigidly secured to said carrier and provided with a circular series of inwardly projecting, radially extending vanes for cooperation with the vanes of said pinion gear, said drum being submersible in said lubricant in the gear housing and being provided with an opening through which the lubricant enters and fills the drum when the latter is submerged in the lubricant, which lubricant serves to resist rotation of the vanes of said pinion gear relative to the drum, and a flange member extending inwardly from the peripheral edge of said drum across the open end thereof to retain a substantial portion of the lubricant in the drum when the latter is revolved about the axis of said carrier.

(References on following page)

References Cited in the file of this patent

UNITED STATES PATENTS

| | | |
|---|---|---|
| 1,479,752 | Smith | Jan. 1, 1924 |
| 1,916,715 | Corey | July 4, 1933 |
| 1,936,165 | Jansen | Nov. 21, 1933 |
| 2,272,416 | McVoy | Feb. 10, 1942 |
| 2,465,919 | Novak | Mar. 29, 1949 |

FOREIGN PATENTS

| | | |
|---|---|---|
| 418,582 | Great Britain | Apr. 19, 1934 |
| 845,904 | Germany | Aug. 7, 1952 |